United States Patent [19]

Sayers

[11] 4,043,184

[45] Aug. 23, 1977

[54] APPARATUS FOR MEASURING THE SWING WEIGHT OF SPORTING IMPLEMENTS

[76] Inventor: Bernard Sayers, Sharp Lane, Newport, N.J. 08345

[21] Appl. No.: 632,948

[22] Filed: Nov. 18, 1975

[51] Int. Cl.² .......................................... G01M 1/10
[52] U.S. Cl. .................................................. 73/65
[58] Field of Search .......................................... 73/65

[56] References Cited

U.S. PATENT DOCUMENTS

| | | | |
|---|---|---|---|
| 1,568,698 | 1/1926 | Vaile et al. | 73/65 |
| 1,825,172 | 9/1931 | Barret | 73/65 |
| 1,953,916 | 4/1934 | Adams | 73/65 |
| 3,392,576 | 7/1968 | Hollander, Jr. | 73/141 R |

Primary Examiner—Charles A. Ruehl
Attorney, Agent, or Firm—John J. Byrnz; Edward E. Dyson

[57] ABSTRACT

An apparatus incorporating an electrobalance mechanism to measure the dynamic swing weight of a sporting implement.

3 Claims, 7 Drawing Figures

U.S. Patent  Aug 23, 1977  Sheet 2 of 2  4,043,184
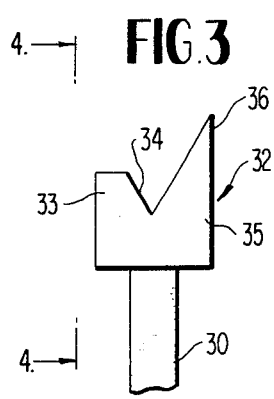
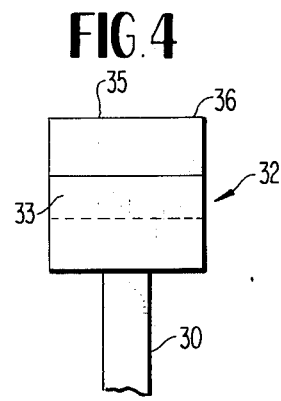
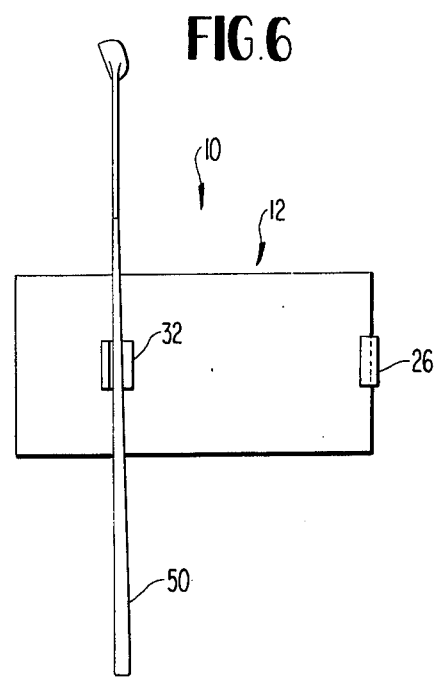
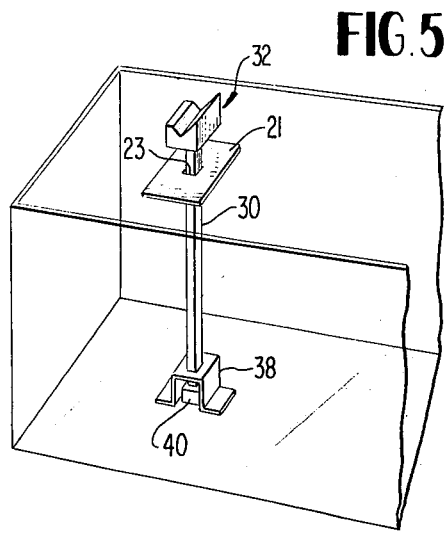
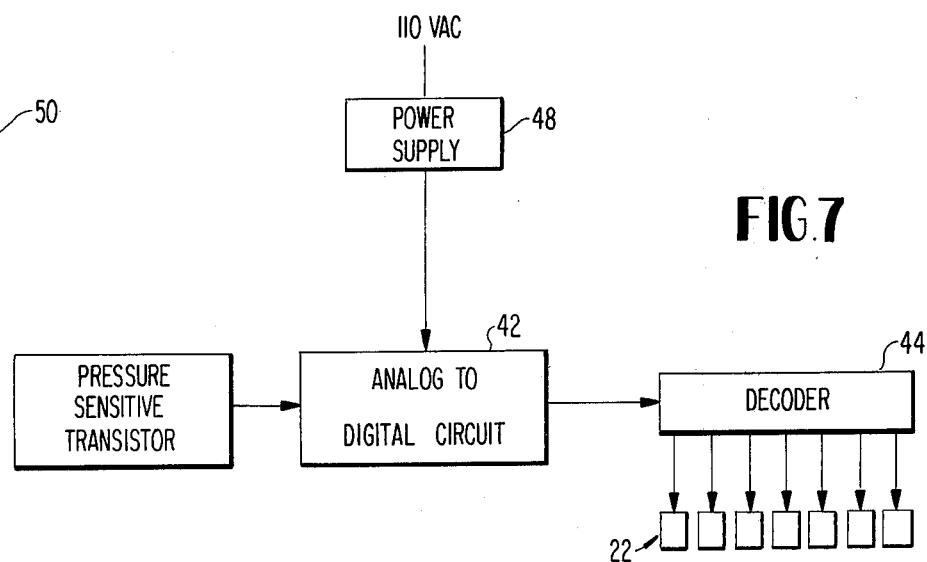

1

APPARATUS FOR MEASURING THE SWING WEIGHT OF SPORTING IMPLEMENTS

BACKGROUND OF THE INVENTION

1. Field of the Invention.

This invention relates to an apparatus having means for comparing the swing weights of sporting implements and, in particular, golf clubs. The apparatus is constructed with a load-bearing member of an electrobalance mechanism positioned at that point on the club shaft where the weight of the club is concentrated when in the hands of a user. In this manner, the torsion measurement obtained by the balance is directly related to the swing weight the club exhibited in use.

2. Description of the Prior Art.

Present methods in the patented art for weighing and comparing golf clubs generally rely on mechanical balancing. Exemplary of this are the teachings in United States Pat. Nos. 1,953,916 and 2,595,717. The methods taught by these patents have several disadvantages which the present invention remedies. In many prior art teachings the point from which the swing weight of the club is measured is not related to the physical dynamics of the club; that is, the torsional measurement is not taken at the fulcrum or axis of rotation of the club.

However, sporting implements have in some instances also been compared and weighed by the techniques disclosed in the U.S. Pat. No. 1,568,698 to Vaile, et al. Vaile discloses a balance to measure the swing weight of a sporting implement by holding the implement intermediate its shaft length and measures a value related to the weight and length of the implement. The Vaile method has not gained prominence in the golf industry. Vaile et al does not incorporate an electro-balance. The Murdoch U.S. Pat. No. 2,094,806 uses a socket arrangement with its weight means.

SUMMARY OF THE INVENTION

As discussed above, the swing weight of a golf club has been measured by various methods in the past but there is not presently a standardized practice for making swing weight measurements. The measurement is therefore one which is only generally related to the distribution of weight in the golf club. The dynamic swing weight, on the other hand, is directly related to the dynamics of the club as it is swung by a golfer and is somewhat analogous to the moment of inertia or the torque on the golf club about an axis perpendicular to the club shaft and located at a standardized point on the club shaft. This point is determined in the manner set forth below. If the measured swing weight is to be related to the dynamics of the club in use, the measurements must be taken at the point of the fulcrum or the axis of rotation of the club as it exists in the golf swing. When a golf club or similar sporting implement is used to impart energy to a golf ball or similar projectile, the club assumes the action of a third class lever. The lever action determines the fulcrum or axis of rotation.

In practice, the position of the fulcrum or axis of a sporting implement is readily approximated by one of professional skill in that sport. The determination is made for a golf club by gripping the surface of the shaft at the grip end of the club opposite the club head. The major point of pressure between the fingers and the club occurs between the club and the thumb and index finger of the hand closest to the club head. Although the span of each golfer's hand from the grip end will be different, a point about eight inches from the grip end of the club represents an acceptable mean distance for the major pressure point. It is at the major pressure point where the weight of the club in the hands of the golfer is concentrated and it is from this point that the action of the club extends during a swing. This point, therefore, represents a good approximation of the fulcrum or axis of the golf club. When the invention described herein is used to measure the dynamic swing weight of a golf club, the load-bearing member of an electrobalance is positioned at a point approximately eight inches from the grip end of the club. In this manner, the measured swing weight is related to the physical dynamics of the golf club and a useful and informative measurement is obtained. The measurement is quick, the results are immediately displayed and time-consuming, weight-shifting steps are eliminated.

The invention herein incorporates the use of an electrobalance to provide accuracy and simplicity to the swing weight measurement which is not present in balances which have been used in the past.

It must be remembered that the expert aiding in the selection of a particular club uses his experience, the weight, build, strength of the purchaser, any unusual facets in his muscular-skeletal make-up and any pecularities in his natural movements in making club selections. These observations are made in concert with club weight and club dynamics. In view of the instant readings that are accomplished through the use of the instant invention, the efficiency of a club selection session is greatly increased.

It is the principal object of this invention to provide a quick and accurate means to measure the dead weight and the dynamic swing weight of a golf club.

It is another object of this invention to provide a means to measure the swing weight of a club in a manner that indicates the change in the balance of the club when weight is subtracted from or added to or adjusted in the club.

These and other objectives will be made more clear in view of the following.

DESCRIPTION OF THE DRAWINGS

FIG. 3 is an enlarged view of the pedestal member;

FIG. 4 is a side elevation view taken along the line 4—4 of FIG. 3;

FIG. 5 is a partial perspective view of the scale within a protective enclosure shown as a transparency so that the extension of the pedestal to the weight-sensing means can be seen;

FIG. 6 is a plan view of the scale illustrating the position of the golf club when measuring overall weight; and FIG. 7 is a block diagram of the basic electric circuitry of the invention disclosed in FIGS. 1-6.

Figure 1:
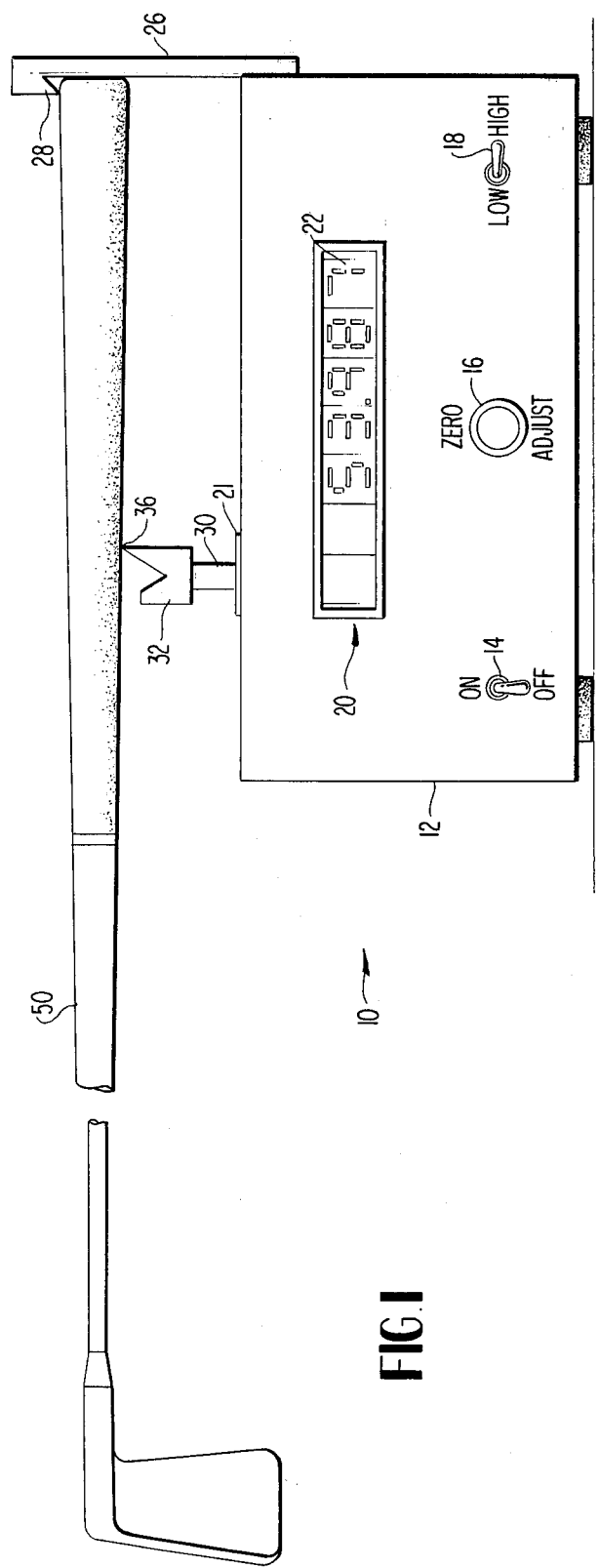
FIG. 1 is an elevation view of the scale of this invention with a golf club positioned for a swing weight measurement.
Figure 2:
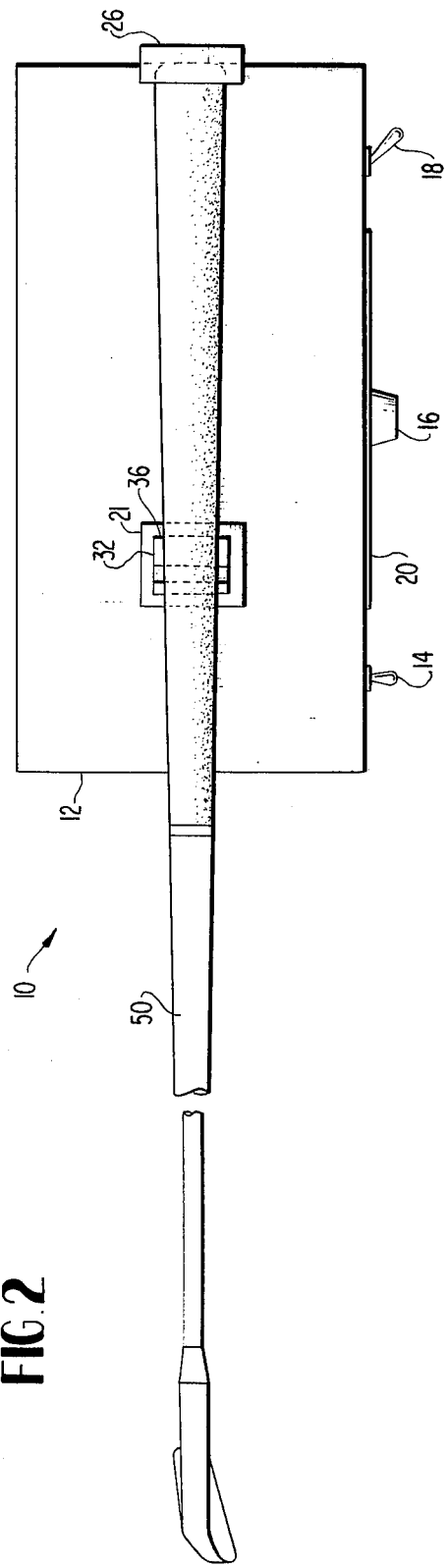
FIG. 2 is a plan view of FIG. 1.

Referring now to the drawings wherein like elements are represented by like numbers, the apparatus of this invention is designated generally by the numeral 10. An electrobalance housing is indicated by the numeral 12. Extending upwardly from one end of housing 12 is a club positioning standard 26 having an inwardly directed flange 28. Electrobalance housing 12 is provided with an on-off switch 14, a zero adjustment knob 16 and a high-low scale switch 18. The electrobalance housing 12 also includes a display array 20 having a seven segment diode display 22.

The club supporting standard 26 is attached to the housing 12 at its lower end by screws or the like. The flange 28 retains the sporting implement 50, in this instance a golf club, in a horizontal position during weighing.

Housing 12 through the top thereof is formed with an opening 23 fitted with a sleeve or bushing 21. Extending through the bushing is a standard 30 having a club fulcrum support 32 at its upper end. At its lower end, the standard 30 is connected to a pressure-sensitive transistor assembly 40 which is located interiorly of housing 12.

The pressure-sensitive transistor assembly is of a type for translating the weight of an object into an electrical impulse and such equipment is well known in the electrical arts.

The fulcrum support 32 has a cradle 34 formed by a section 33 and a section 35 having a knife edge 36 at its upper end. The shaft of a golf club 50 can be placed within member 32 to determine its normal or dead weight or the club can be positioned on the knife edge 36 with its handle end below inwardly directed flange 28. The knife edge 36 defines the point at which the weight of the club 50 transmits to standard 30 for an accurate "dynamic swing weight" reading to assembly 40.

To measure the dynamic swing weight, club 50 is placed in a horizontal position with its grip end abutting stop member 26 and its mid-portion on knife edge 36. The knife edge 36 is located eight inches from the grip end of the club as heretofore mentioned.

The force on edge 36, sensed by assembly 40, is the product of weight distribution over the entire length of the club. If the distance between the club head and edge 36 is longer than normal, the weight thereof will act over a greater distance and, of course, will reflect a greater weight to sensor assembly 40.

It should be appreciated that only a slight increase or decrease in the weight of the club head has a relatively large effect on the measured weight because of the distance involved. This will be analogous to the effect such weight changes would have on the feel of the club in the hands of the golfer. The overall or dead weight of club 50 is measured as shown in FIG. 6 by merely placing club 50 in cradle 34.

It can be readily observed that housing 12 can be located at table or bench level for easy manipulation of the club. The dynamic and dead weights of selected clubs can readily be observed. Weights and other adjustments can readily be added without complicated and time-comsuming weight adjustment maneuvers.

In a general manner, while there has been disclosed an effective and efficient embodiment of this invention, it should be well understood that the invention is not limited to such embodiments as there might be changes made in the arrangement, disposition, and form of the parts without departing from the principles of the present invention as comprehended within the scope of the accompanying claims.

I claim:

1. An apparatus for measuring the dynamic and dead weight of a golf club comprising, a housing having an opening in the top thereof, a bracket extending upwardly from said housing at a point spaced longitudinally of said housing from said opening, a flange at the upper end of said bracket, a lower surface forming a part of said flange, an electric weight measuring device in said housing, a standard having its lower end connected to said weight measuring device and extending upwardly through said opening, a fulcrum support affixed to the upper end of said standard and having a cradle transverse to said housing, a knife edge member defining one side of said cradle and parallel thereto, said edge member terminating in a plane spaced below the plane of said lower surface of said flange a distance equal to the diameter of the grip of said golf club whereby a golf club can be secured to said apparatus by placing the grip end under said lower surface and an intermediate portion of said shaft on said edge member and the moment measured by said device, and means on said housing to convert the moment measurement into a numerical readout.

2. The apparatus of claim 1 wherein said edge member and said bracket are spaced apart a distance at which the action of said club supported thereby simulates the action of said club in actual use.

3. The apparatus of claim 2 wherein said distance is approximately eight inches.

* * * * *